(12) United States Patent
Sasaki

(10) Patent No.: US 9,681,039 B2
(45) Date of Patent: Jun. 13, 2017

(54) IMAGE PROCESSING APPARATUS, IMAGE PROCESSING METHOD, AND PROGRAM FOR FILTER PROCESSING

(71) Applicant: CANON KABUSHIKI KAISHA, Tokyo (JP)

(72) Inventor: Takashi Sasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 14/815,535

(22) Filed: Jul. 31, 2015

(65) Prior Publication Data

US 2016/0037062 A1    Feb. 4, 2016

(30) Foreign Application Priority Data

Aug. 1, 2014   (JP) .................................. 2014-157798

(51) Int. Cl.
| | |
|---|---|
| *H04N 5/232* | (2006.01) |
| *G06T 5/00* | (2006.01) |
| *G06T 5/20* | (2006.01) |
| *H04N 5/262* | (2006.01) |
| *H04N 5/907* | (2006.01) |
| *H04N 5/77* | (2006.01) |
| *H04N 101/00* | (2006.01) |

(52) U.S. Cl.
CPC ......... *H04N 5/23212* (2013.01); *G06T 5/002* (2013.01); *G06T 5/20* (2013.01); *H04N 5/23235* (2013.01); *H04N 5/2621* (2013.01); *H04N 5/772* (2013.01); *H04N 5/907* (2013.01); *H04N 2101/00* (2013.01)

(58) Field of Classification Search
CPC ........... H04N 5/23212; H04N 5/23235; H04N 5/2621; H04N 5/907; H04N 5/772; H04N 9/045; H04N 2101/00; G06T 5/002; G06T 5/20
See application file for complete search history.

(56) References Cited

U.S. PATENT DOCUMENTS

2014/0160325 A1*   6/2014   Hirai ....................... G06T 5/003
                                                               348/252

FOREIGN PATENT DOCUMENTS

| JP | 2004-102904 A | 4/2004 |
|---|---|---|
| JP | 2004-145615 A | 5/2004 |

* cited by examiner

*Primary Examiner* — Albert Cutler
(74) *Attorney, Agent, or Firm* — Canon USA, Inc. IP Division

(57) ABSTRACT

An image processing apparatus includes an acquisition unit configured to acquire a plurality of divided filters being configured such that a calculation result becomes a target filter to be applied to an input image, a filter processing unit configured to apply the plurality of divided filters to the input image to generate intermediate images for the plurality of respective divided filters, and an addition unit configured to add the intermediate images generated for the plurality of respective divided filters while shifting positions of the respective intermediate images so that positions of focused pixels of the plurality of respective divided filters align with a position of a focused pixel of the target filter to generate an output image, wherein the filter processing unit generates the intermediate images while changing an area to be used for performing calculation, for each of the plurality of divided filters.

12 Claims, 8 Drawing Sheets

IMAGE PROCESSING APPARATUS, IMAGE PROCESSING METHOD, AND PROGRAM FOR FILTER PROCESSING

BACKGROUND OF THE INVENTION

Field of the Invention

The present invention relates to, in particular, an image processing apparatus, an image processing method, and a program that are suitably used for filter processing.

Description of the Related Art

Generally, in image-capturing using compact digital cameras, a relatively broad distance range comes into focus as compared with a case of image-capturing using single-lens reflection cameras. Thus, it is difficult for compact digital cameras to capture an image in which a background is largely blurred as in the case of single-lens reflection cameras. Therefore, to obtain a large blurring effect, conventional compact digital cameras perform digital filter processing so as to add blurring that has the size equivalent to the size of blurring obtainable through image-capturing using single-lens reflection cameras to a captured image.

For example, Japanese Patent Application Laid-Open No. 2004-102904 discloses a technique of applying small-sized filter processing on a reduced image and then enlarging the image to an original size so as to add large blurring to an image through small-sized filter processing. In addition, Japanese Patent Application Laid-Open No. 2004-145615 discloses a technique of dividing a large-sized filter into small-sized filters, and adding small-sized filtering results, thereby obtaining a result equivalent to that obtainable in filtering using a large-sized filter, while reducing the circuit size.

The conventional art disclosed in Japanese Patent Application Laid-Open No. 2004-102904, however, cannot faithfully reproduce background blurring as in the case of single-lens reflection cameras due to the small filtering size. For example, as one imaging technique of single-lens reflection cameras, there is a method of largely and roundly blurring a point light source in a background. Nevertheless, details of the shape of the round blurring cannot be sufficiently expressed through the small-sized filter processing disclosed in Japanese Patent Application Laid-Open No. 2004-102904 described above. In addition, the method described in Japanese Patent Application Laid-Open No. 2004-145615 has such an issue that the calculation amount required for the filter processing increases.

SUMMARY OF THE INVENTION

An image processing apparatus according to the present invention includes an acquisition unit configured to acquire a plurality of divided filters being configured such that a calculation result becomes a target filter to be applied to an input image, a filter processing unit configured to apply the plurality of divided filters to the input image to generate a plurality of intermediate images, and an addition unit configured to add the plurality of intermediate images while shifting positions of the respective intermediate images so that positions of the respective intermediate images correspond to a position of a focused pixel of the target filter to generate an output image, wherein the filter processing unit generates the intermediate images while changing an area to be used for performing calculation, for each of the plurality of divided filters.

Further features of the present invention will become apparent from the following description of exemplary embodiments (with reference to the attached drawings).

DESCRIPTION OF THE EMBODIMENTS

Figure 1:
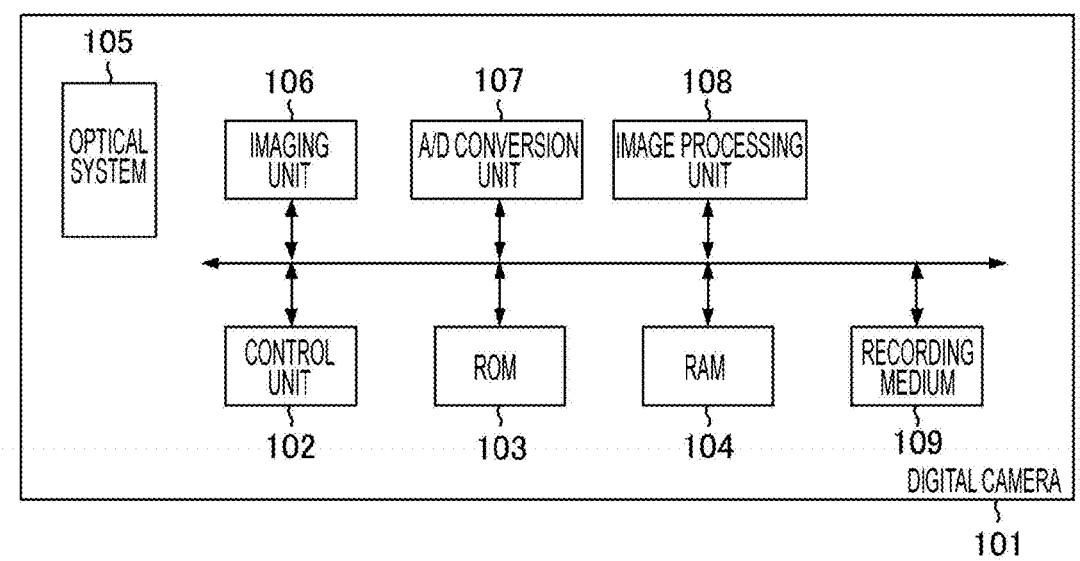
FIG. 1 is a block diagram illustrating a configuration example of a digital camera according to an exemplary embodiment.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

An exemplary embodiment of the present invention will be described below with reference to the drawings. The exemplary embodiment described below is an example in which the present invention is applied to a digital camera serving as an example of an image processing apparatus. The present invention is, however, not limited to the following exemplary embodiment, and various modifications and changes can be made within the gist of the present invention.

FIG. 1 is a block diagram illustrating a configuration example of a digital camera 101 according to the present exemplary embodiment.

In FIG. 1, a control unit 102 is, for example, a central processing unit (CPU). The control unit 102 controls the operations of respective blocks included in the digital camera 101 in the following manner. First, the control unit 102 reads the operation programs of the respective blocks included in the digital camera 101 from a read-only memory (ROM) 103, and loads the read operation programs into a random access memory (RAM) 104. Then, the control unit 102 executes the loaded operation programs, thereby controlling the operations of the respective blocks. The ROM 103 is a rewritable nonvolatile memory. In addition to the operation programs of the respective blocks included in the digital camera 101, the ROM 103 stores, for example, parameters necessary for the operations of the respective blocks. The RAM 104 is a rewritable volatile memory. The RAM 104 is used as a temporary storage area for data output in the operations of the respective blocks included in the digital camera 101.

An optical system 105 forms an object image on an imaging unit 106. The imaging unit 106 is an image sensor such as a charge-coupled device (CCD) sensor and a complementary metal-oxide semiconductor (CMOS) sensor. The imaging unit 106 photoelectrically converts an optical image formed on the image sensor by the optical system 105, and outputs an obtained analog image signal to an analog-to-digital (A/D) conversion unit 107. The A/D conversion unit 107 applies A/D conversion processing to the input analog image signal, and outputs obtained digital image data to the RAM 104 to store the obtained digital image data therein.

An image processing unit 108 adds desired blurring to a captured image by performing filter processing or the like on image data stored in the RAM 104. A recording medium 109 is a detachable memory card or the like. For example, the image data processed by the image processing unit 108 and the image data A/D-converted by the A/D conversion unit 107 that are stored in the RAM 104 are recorded onto the recording medium 109 as recorded images.

Figure 2:
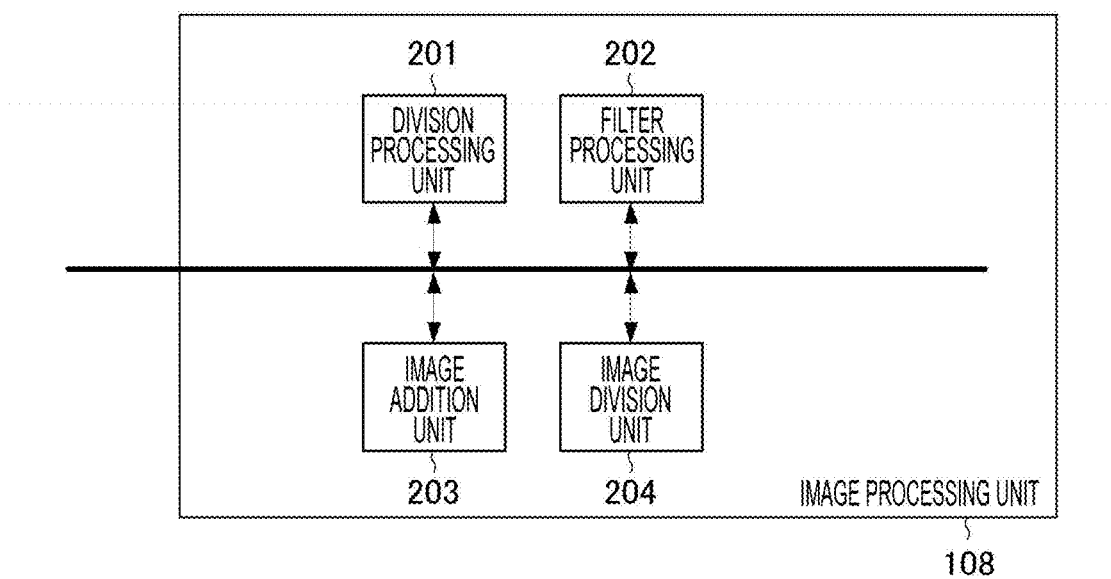
FIG. 2 is a block diagram illustrating an example of a specific configuration of an image processing unit.
Figure 3:
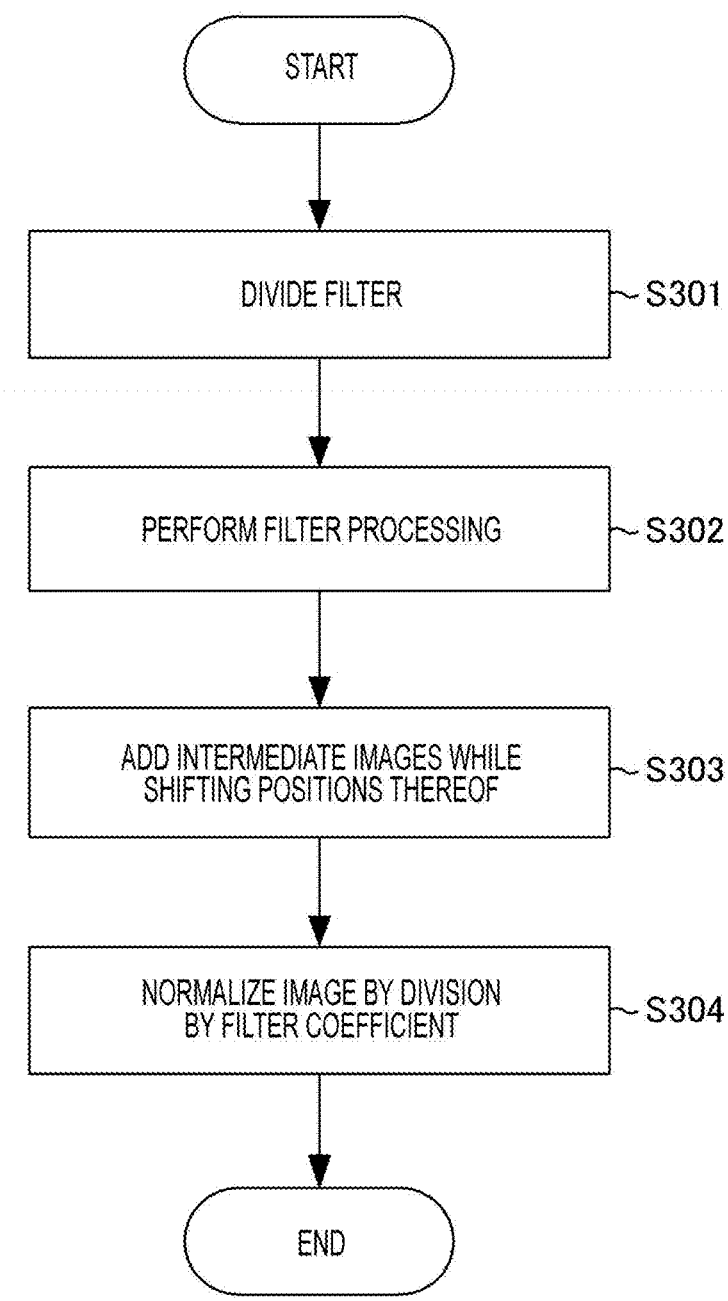
FIG. 3 is a flowchart for illustrating a processing content of the image processing unit.

FIG. 2 is a block diagram illustrating an example of a specific configuration of the image processing unit 108 illustrated in FIG. 1. In addition, FIG. 3 is a flowchart for illustrating a processing content of the image processing unit 108. The description will be given below in accordance with the flowchart illustrated in FIG. 3.

Figure 4A:
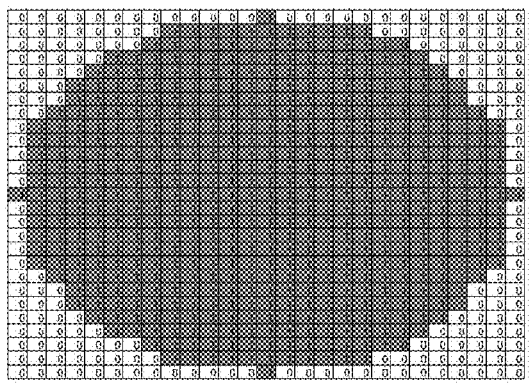
FIGS. 4A and 4B are diagrams each illustrating an example of a two-dimensional filter.
Figure 4B:
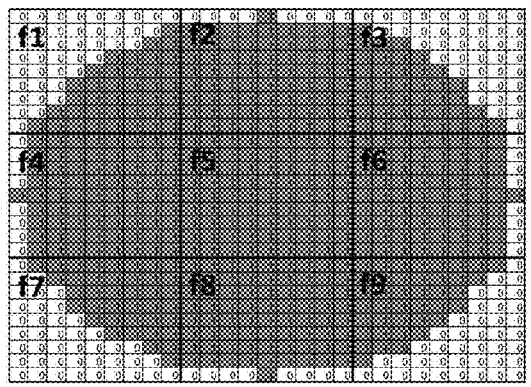

First, in step S301, a division processing unit 201 divides a target filter to be applied to a captured image into a plurality of filters to obtain divided filters. For example, with respect to the target filter having a predetermined number of taps and predetermined filter coefficients that are determined based on the setting according to a user operation or an image analysis result, the number of divided filters is determined according to the specification of a filter processing unit 202, and a plurality of divided filters is set. At this time, the division processing unit 201 is only required to obtain a plurality of divided filters being configured such that a calculation result becomes a target filter to be applied to an input image. In other words, for example, a plurality of patterns of target filters may be prepared in advance. In this case, the division processing unit 201 may read and obtain divided filters for the respective target filters that are prepared and stored in a memory (the ROM 103). FIG. 4A is a diagram illustrating an example of a two-dimensional filter to be divided. As illustrated in FIG. 4A, the undivided two-dimensional filter has a cylindrical filter shape. By applying filter processing to a captured image using such a filter, round blurring as if the image is captured by a single-lens reflection camera can be expressed. In addition, FIG. 4B is a diagram for illustrating filters obtained after division processing. In FIG. 4B, a two-dimensional filter is divided vertically into 3 blocks and horizontally into 3 blocks, and two-dimensional divided filters f1, f2, . . . f9 each have the size of (9 taps)×(9 taps).

Next, in step S302, the filter processing unit 202 performs convolution processing of a captured input image and filter coefficients. General convolution processing will now be described.

Figure 5:
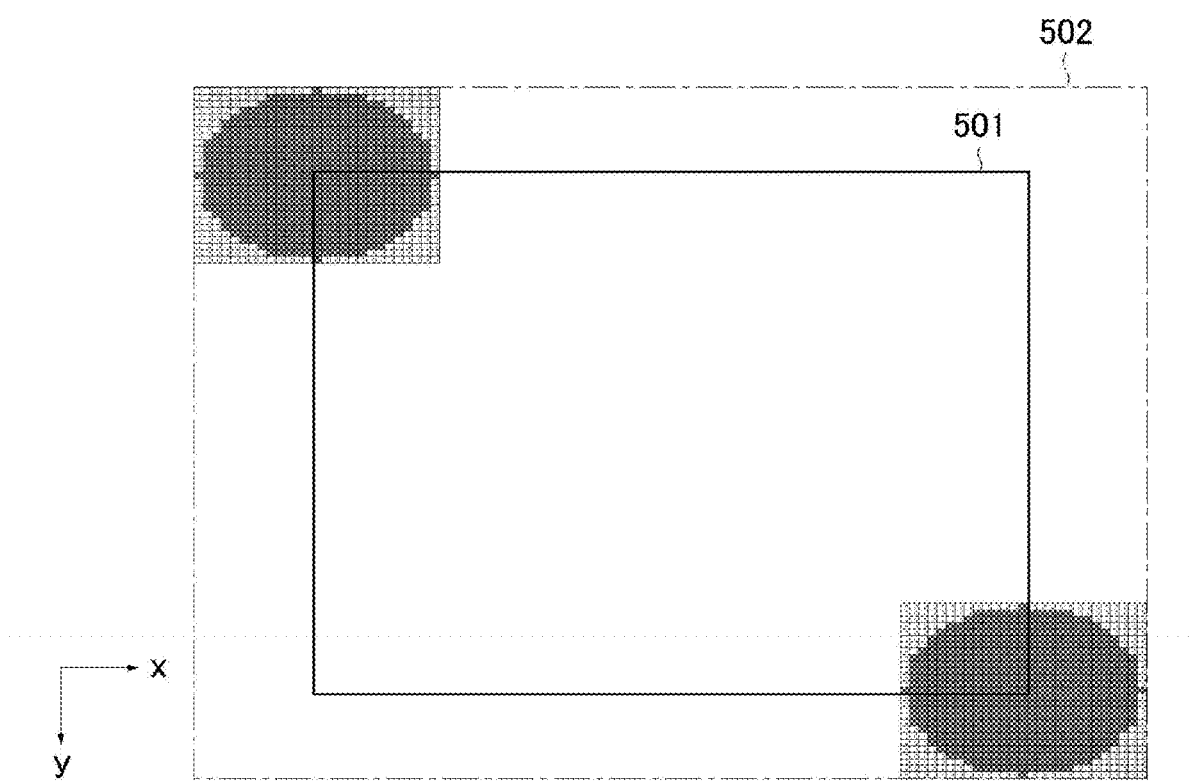
FIG. 5 is a diagram for illustrating a state in which undivided filters are applied to an input image.

FIG. 5 is a diagram for illustrating a state in which the undivided filters as illustrated in FIG. 4A are applied to an input image. FIG. 5 illustrates an input image 501 obtained through image-capturing. In convolution processing, a filter coefficient k (ix, iy) is applied to an input image In (x, y) to obtain an output image Out (x, y) using the following Equation (1):

$$\mathrm{Out}(x, y) = \frac{\sum_{iy=0}^{fs-1} \sum_{ix=0}^{fs-1} k(ix, iy) \times \mathrm{In}(x + ix - fs/2, y + iy - fs/2)}{\sum_{iy=0}^{fs-1} \sum_{ix=0}^{fs-1} k(ix, iy)},$$

where x and y in the input image In (x, y) represent coordinate values (horizontal coordinate x, vertical coordinate y) of a focused pixel. In addition, ix and iy in the filter coefficient k (ix, iy) represent the position (horizontal coordinate ix, vertical coordinate iy) of the filter coefficient, and fs represents a filter size.

When an upper left vertex coordinate (x, y)=(0, 0) of the input image 501 illustrated in FIG. 5 is focused on, filter coefficients exist outside the input image. If the filter extends out of the input image in this manner, in general image processing, calculation of Equation (1) for the area extending out of the input image is performed in the following manner. The outermost portion or the neighboring portion thereof in the input image is copied to be treated as the input image in the calculation. Alternatively, the value of the filter coefficient of the area is presumed to be "0" in the calculation using Equation (1). In any method, convolution calculation is performed based on the coordinate (x, y)=(−13, −13) that is outside the input image. In a similar manner, when a lower right vertex of the input image 501 is focused on, if the size of the input image 501 is presumed to be m×n, convolution calculation is performed up to the coordinate (x, y)=(m−1+13, n−1+13). An area 502 defined by the dotted line illustrated in FIG. 5 indicates a calculation area to be used in a case in which convolution calculation is performed from the upper left vertex coordinate (x, y)=(−13, −13) up to the lower right vertex coordinate (m−1+13, n−1+13). For example, if the size of the input image 501 is presumed to be 100×100, the number of convolution calculations is 27×27×100×100=7290000 times.

Figure 6:
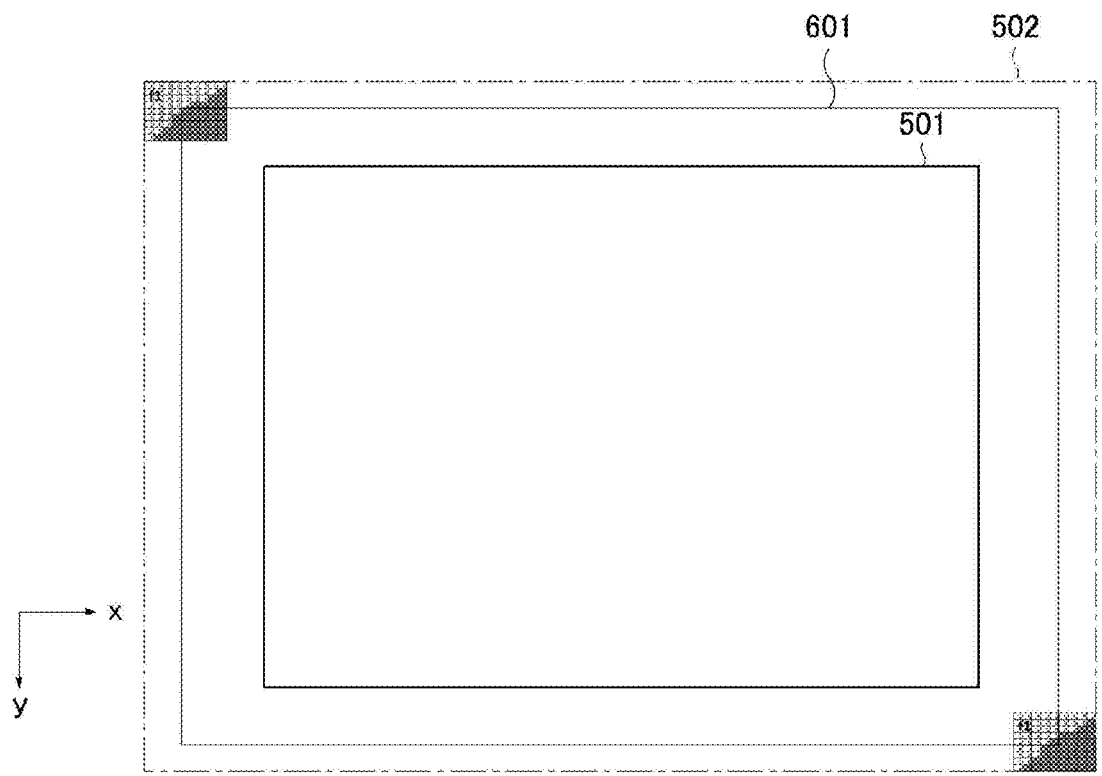
FIG. 6 is a diagram for illustrating a state in which divided filters are applied to an input image.

Next, the description will be given of a case in which division-processed filters as illustrated in FIG. 4B are applied to an input image. FIG. 6 is a diagram for illustrating a case in which divided filters f1 as illustrated in FIG. 4B are applied with an area to be used in convolution calculation being unchanged from the filter calculation area 502 used in a case in which the filter is not divided. An area 601 illustrated in FIG. 6 corresponds to an intermediate image p1 to be output in a case in which the divided filters f1 are applied to the calculation area 502. The number of convolution calculations to be performed in this case is 9×9×118×118=1127844 times. Here, the size of the intermediate image p1 is 118×118.

In a similar manner, when divided filters f2 to f9 are applied to the calculation area 502, and calculation is performed from intermediate images p2 to p9, the total number of convolution calculations is 1127844×9=10150596 times.

Subsequently, from the intermediate images p1 to p9, desired areas corresponding to the size of 100×100 pixels that is equivalent to the size of the input image are respectively read and added. Then, the added images are normalized by the total value of filter coefficients obtainable in an undivided state, whereby an image having the effect equivalent to the effect obtainable in a case in which the filter is not divided can be obtained. Since the total value of filter coefficients illustrated in FIG. 4A is 529, the image obtained by adding the intermediate images p1 to p9 is normalized by 529.

By dividing a filter in this manner, the effect equivalent to the effect obtainable by an undivided filter can be reproduced while reducing the circuit size required for filter processing. Nevertheless, the number of convolution calculations increases as compared with a case in which the filter is not divided.

To solve such an issue, in the present exemplary embodiment, an area to be used in convolution calculation is changed for each divided filter, thereby reducing the number of convolution calculations. The description will be given below of a method for reducing the number of convolution calculations by performing calculation of Equation (1) while presuming that, when a filter coefficient exists outside an input image, the value of the filter coefficient of the outside area is "0".

Figure 7:
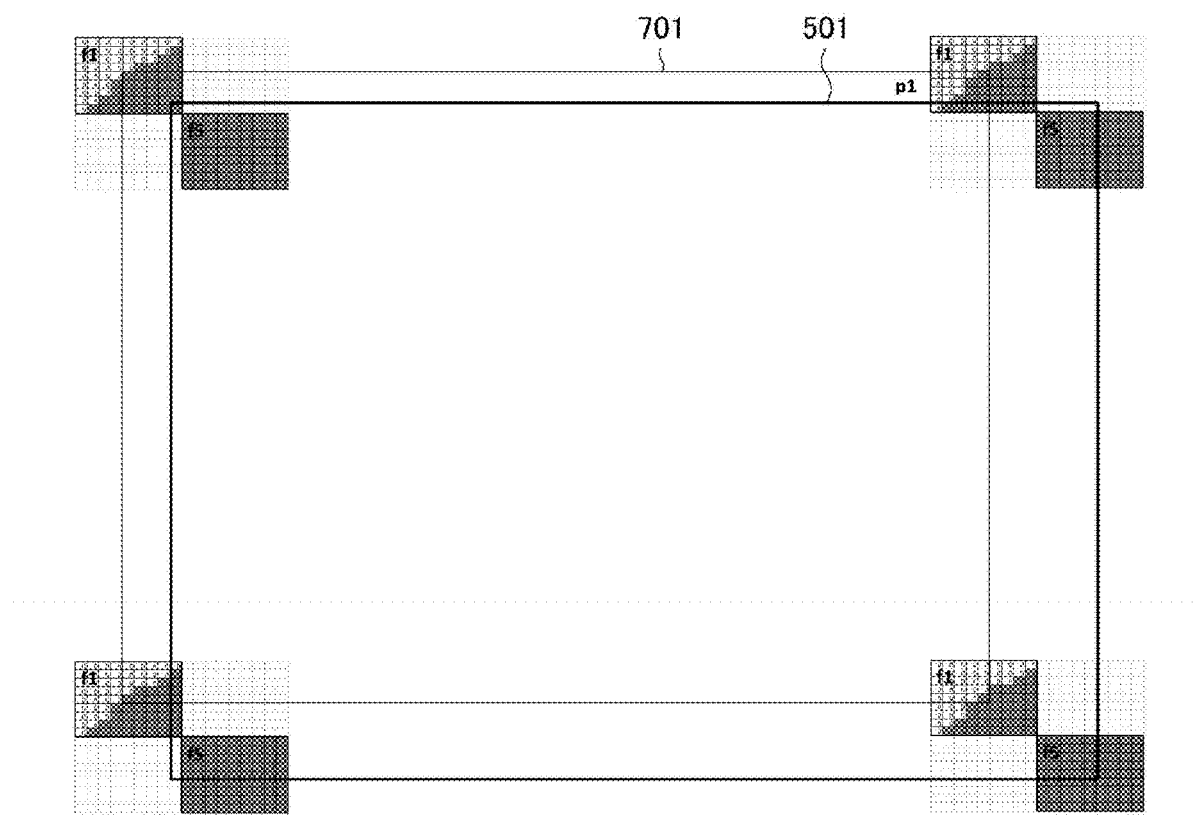
FIG. 7 is a diagram for illustrating a state in which divided filters f1 are applied to an input image according to an exemplary embodiment.

At the upper left of the input image 501, when the divided filter f1 is focused on, a case in which calculation is performed with the value of filter coefficient being not 0 corresponds to a case in which convolution calculation of the divided filter f1 (8, 8) and the pixel of the input image In (0, 0) is performed. In the calculation, f1 (ix, iy) of (9 taps)×(9 taps) is presumed to be (ix, iy)=(0, 0) to (8, 8). In other words, convolution calculation is started from an input image In (x, y)=(−4, −4) as a focused pixel of the divided filter f1. The state of the convolution calculation is illustrated in FIG. 7. FIG. 7 illustrates the divided filters f1 together with divided filters f5 including the focused pixel of the undivided filter. At this time, the size of the input image 501 is presumed to be 100×100.

In addition, as illustrated in FIG. 7, at the upper right of the input image 501, the result of convolution calculation performed up to the input image In (x, y)=(m−1−9, −4)=(90, −4) is applied. Similarly, at the lower left of the input image 501, convolution calculation is started from the input image In (x, y)=(−4, n−1−9)=(−4, 90). Furthermore, at the lower right of the input image 501, convolution calculation is performed up to the input image In (x, y)=(m−1−9, n−1−9)=(90, 90). An area 701 illustrated in FIG. 7 corresponds to the intermediate image p1 of the divided filter f1 that is to be output by performing convolution calculation. In this case, the number of convolution calculations of the divided filter f1 is 9×9×95×95=731025 times. The number of convolution calculations is the same for each of the divided filters f3, f7, and f9.

Figure 8:
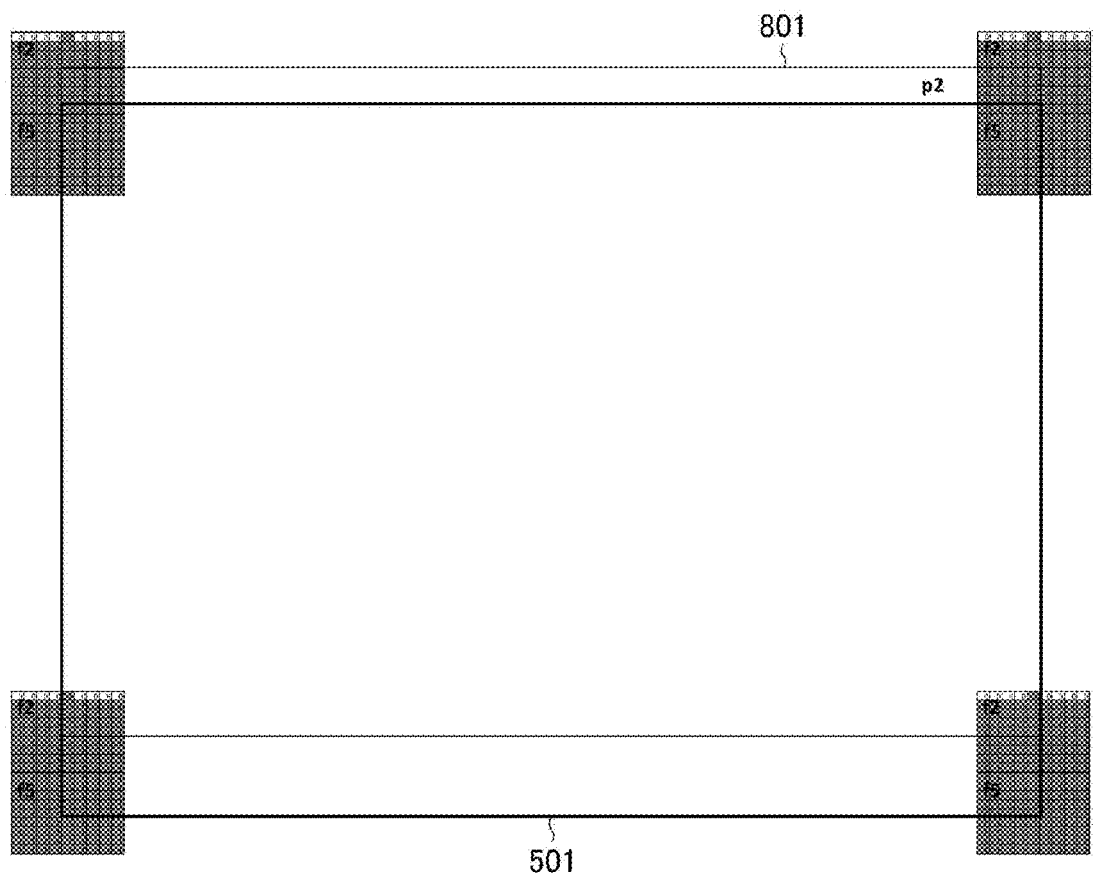
FIG. 8 is a diagram for illustrating a state in which divided filters f2 are applied to an input image according to an exemplary embodiment.

Next, FIG. 8 illustrates a state in which convolution calculation is performed using the divided filters f2. FIG. 8 illustrates the divided filters f2 together with the divided filter f5 including the focused pixel of the undivided filter. In the case of the divided filter f2, convolution calculations are performed in the following areas that include at least a part of the input image 501 respectively, so that the intermediate image p2 indicated by an area 801 is output.
upper left of input image In (x, y)=(0, −4)
upper right of input image In (x, y)=(m−1, −4)=(99, −4)
lower left of input image In (x, y)=(0, n−1−9)=(0, 90)
lower right of input image In (x, y)=(m−1, n−1−9)=(99, 90)

In addition, the number of convolution calculations of the divided filter f2 is 9×9×100×95=769500 times. The number of convolution calculations is the same for each of the divided filters f4, f6, and f8. In addition, the number of convolution calculations of the divided filter f5 is 9×9×100×100=810000 times.

In this manner, if the symmetric property of the filter shape is considered, the total number of calculations obtainable when convolution calculation is performed from the divided filters f1 to f9 is 731025×4+769500×4+810000=6812100 times. Accordingly, the number of convolution calculations can be reduced by 477900 times as compared with the number of convolution calculations obtainable in a case in which a filter is not divided.

Referring back to FIG. 3, in the next step S303, an image addition unit 203 adds the intermediate images p1 to p9 that are output in step S302 while shifting the positions thereof to generate a single image. The image generated in step S303 has the same size as the input image. When an image to which the intermediate images p1 to p9 are added is presumed to be a base image, each intermediate image is shifted by the amount of shift between the focused pixel of each divided filter and the focused pixel of the undivided filter, and added to the base image. More specifically, the amount of shift between the focused pixel of the divided filter f1 and the focused pixel of the undivided filter (identical to the focused pixel of the divided filter f5) is (9, 9). Thus, after the position of the intermediate image p1 is shifted by (9, 9), the intermediate image p1 is added to the base image. At this time, the shift amounts of the respective divided filters are described as follows:

f1=(9, 9)
f2=(0, 9)
f3=(−9, 9)
f4=(9, 0)
f5=(0, 0)
f6=(−9, 0)
f7=(9, −9)
f8=(0, −9)
f9=(−9, −9).

Next, in step S304, an image division unit 204 normalizes the base image to which the intermediate images p1 to p9 are added in step S303, by performing, for each pixel, division by the total value of the filter coefficients. In the calculation, if a filter coefficient exists outside the input image, the value of the filter coefficient of the area is calculated as "0".

As described above, according to the digital camera of the present exemplary embodiment, through small-sized two-dimensional filter processing such as 9-tap two-dimensional filter processing, the blurring obtainable through 27-tap two-dimensional filter processing can be added to a captured image without impairing details. At this time, an area to be used in convolution calculation is changed for each divided filter, whereby the number of convolution calculations is reduced. In other words, there can be provided an image processing apparatus capable of faithfully reproducing wide-area background blurring as in image-capturing using single-lens reflection cameras, while reducing the circuit size required for filter processing and also reducing the calculation amount required when filter processing is performed on the edge area of image data.

In short, according to the present invention, blurring can be faithfully reproduced while reducing the circuit size required for filter processing and also reducing the calculation amount required for filter processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157798, filed Aug. 1, 2014, which is hereby incorporated by reference herein in its entirety.

What is claimed is:

1. An image processing apparatus comprising a processor and a memory containing instructions that when executed by the processor, cause the processor to perform operations, comprising:
acquiring a plurality of divided filters being configured such that a calculation result becomes a target filter to be applied to an input image;
generating a plurality of intermediate images by applying the plurality of divided filters to the input image; and
adding the plurality of intermediate images while shifting positions of the respective intermediate images so that positions of the respective intermediate images correspond to a position of a focused pixel of the target filter to generate an output image,
wherein the generating generates the intermediate images while changing an area to be used for performing calculation, for each of the plurality of divided filters.

2. The image processing apparatus according to claim 1, wherein the generating generates the intermediate images by performing calculation in such areas that include at least a part of the input image respectively.

3. The image processing apparatus according to claim 2, wherein the adding generates the output image by normalizing, for each pixel, an image to which the intermediate images respectively corresponding to the plurality of divided filters are added, according to a filter coefficient.

4. The image processing apparatus according to claim 1, wherein the generating generates the intermediate images by performing calculation in such areas that include at least a part of the input image respectively, and the focused pixel of the target filter is included in the input image.

5. An image processing method, comprising:
acquiring a plurality of divided filters being configured such that a calculation result becomes a target filter to be applied to an input image;
applying the plurality of divided filters to the input image to generate a plurality of intermediate images; and
adding the intermediate images generated for the plurality of respective divided filters while shifting positions of the respective intermediate images so that positions of focused pixels of the plurality of respective divided filters align with a position of a focused pixel of the target filter to generate an output image,
wherein the intermediate images are generated while changing an area to be used for performing calculation, for each of the plurality of divided filters.

6. The image processing method according to claim 5, wherein the intermediate images are generated by performing calculation in such areas that include at least a part of the input image respectively.

7. The image processing method according to claim 6, wherein the adding generates the output image by normalizing, for each pixel, an image to which the intermediate images respectively corresponding to the plurality of divided filters are added, according to a filter coefficient.

8. The image processing method according to claim 5, wherein the intermediate images are generated by performing calculation in such a range that the divided filters each include at least a part of the input image, and the focused pixel of the target filter is included in the input image.

9. A non-transitory computer readable storage medium storing a computer-executable program of instructions for causing a computer to perform a method comprising:
acquiring a plurality of divided filters being configured such that a calculation result becomes a target filter to be applied to an input image;
applying the plurality of divided filters to the input image to generate a plurality of intermediate images; and
adding the plurality of intermediate images while shifting positions of the respective intermediate images so that positions of the respective intermediate images correspond to a position of a focused pixel of the target filter to generate an output image,
wherein the intermediate images are generated while changing an area to be used for performing calculation, for each of the plurality of divided filters.

10. The non-transitory computer readable storage medium according to claim 9, wherein the intermediate images are generated by performing calculation in such areas that include at least a part of the input image respectively.

11. The non-transitory computer readable storage medium according to claim 10, wherein the adding generates the output image by normalizing, for each pixel, an image to which the intermediate images respectively corresponding to the plurality of divided filters are added, according to a filter coefficient.

12. The non-transitory computer readable storage medium according to claim 9, wherein the intermediate images are generated by performing calculation in such areas that include at least a part of the input image respectively, and the focused pixel of the target filter is included in the input image.

* * * * *